(12) United States Patent
Higuchi

(10) Patent No.: US 6,636,148 B2
(45) Date of Patent: Oct. 21, 2003

(54) PERIPHERY MONITORING SYSTEM

(75) Inventor: Takashi Higuchi, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 93 days.

(21) Appl. No.: 09/929,413

(22) Filed: Aug. 13, 2001

(65) Prior Publication Data

US 2002/0027503 A1 Mar. 7, 2002

(30) Foreign Application Priority Data

Sep. 4, 2000 (JP) ........................................ 2000-266393
Nov. 15, 2000 (JP) ........................................ 2000-348032
Nov. 29, 2000 (JP) ........................................ 2000-363130

(51) Int. Cl.$^7$ ................................................. B60R 1/00
(52) U.S. Cl. ........................ 340/436; 340/435; 340/937; 701/96
(58) Field of Search ................................ 340/435, 436, 340/903, 904, 937; 180/167, 168, 169; 701/93, 96, 70, 300, 301

(56) References Cited

U.S. PATENT DOCUMENTS

| | | | | |
|---|---|---|---|---|
| 5,245,422 A | * | 9/1993 | Borcherts et al. ............. | 701/93 |
| 5,818,355 A | * | 10/1998 | Shirai et al. ................. | 340/903 |
| 6,282,478 B1 | * | 8/2001 | Akita ........................... | 701/70 |
| 6,282,483 B1 | * | 8/2001 | Yano et al. .................. | 340/903 |
| 6,311,119 B2 | * | 10/2001 | Sawamoto et al. ......... | 340/435 |
| 6,438,491 B1 | * | 8/2002 | Farmer ........................ | 340/436 |

* cited by examiner

Primary Examiner—Van Trieu
(74) Attorney, Agent, or Firm—Christie, Parker & Hale, LLP

(57) ABSTRACT

A periphery monitoring system of a first embodiment controlling the cruising of a mounted vehicle by judging which of a first region along a path of advance of the mounted vehicle, a second region near the outside of the first region, and a third region other than the first and second regions a target detected by a radar system is in; a periphery monitoring system of a second embodiment detecting an inspection plane based on an output of a television camera and radar system and judging a vehicle has cut in front when the time by which an inspection plane outside of the cruising lane reaches a boundary line is smaller than a certain threshold value; and a periphery monitoring system of a third embodiment detecting an inspection plane based on an output of a television camera and radar system and judging the range surrounded by inspection planes in which there is no target and the mounted vehicle can pass as an advance range.

23 Claims, 18 Drawing Sheets

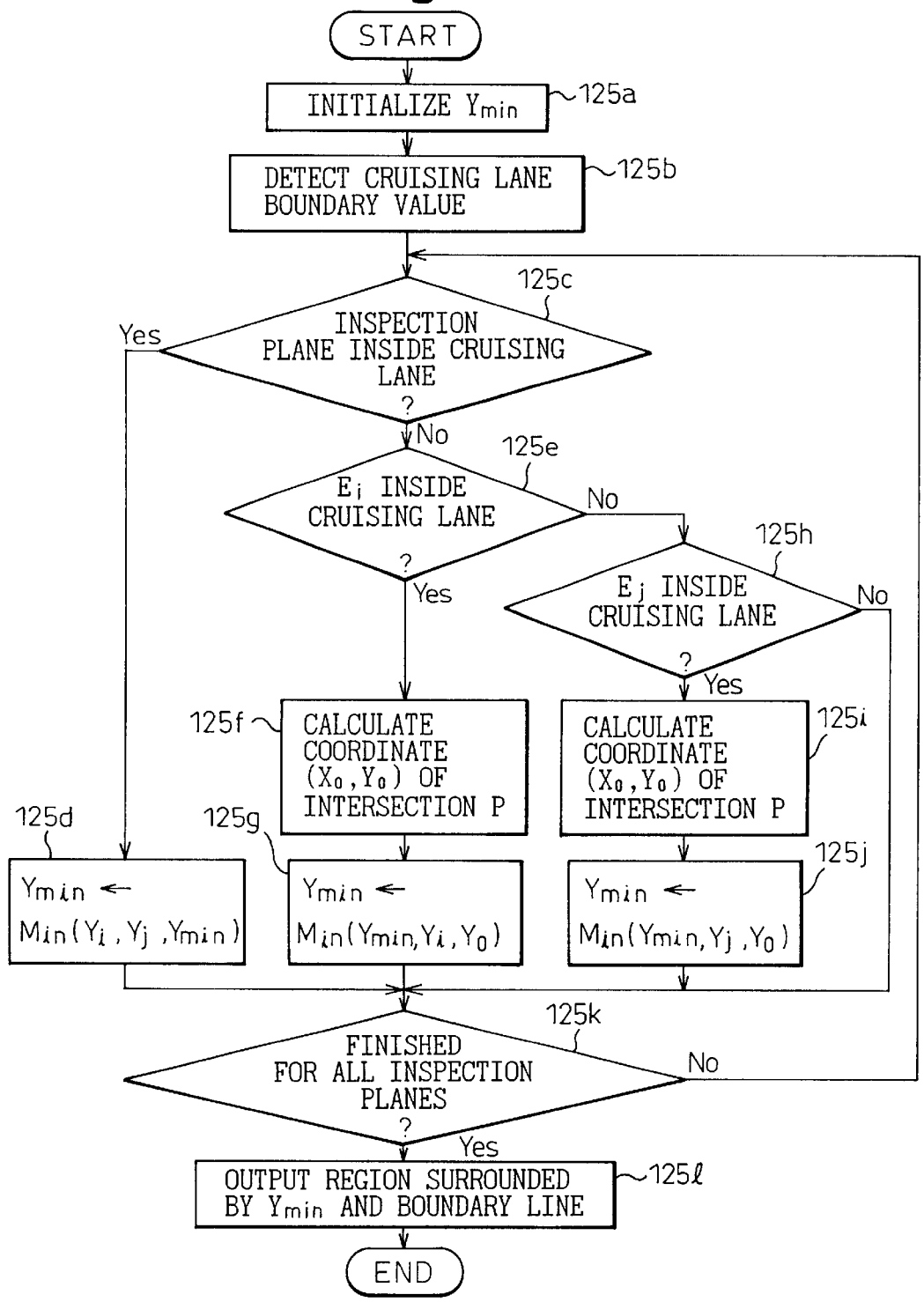

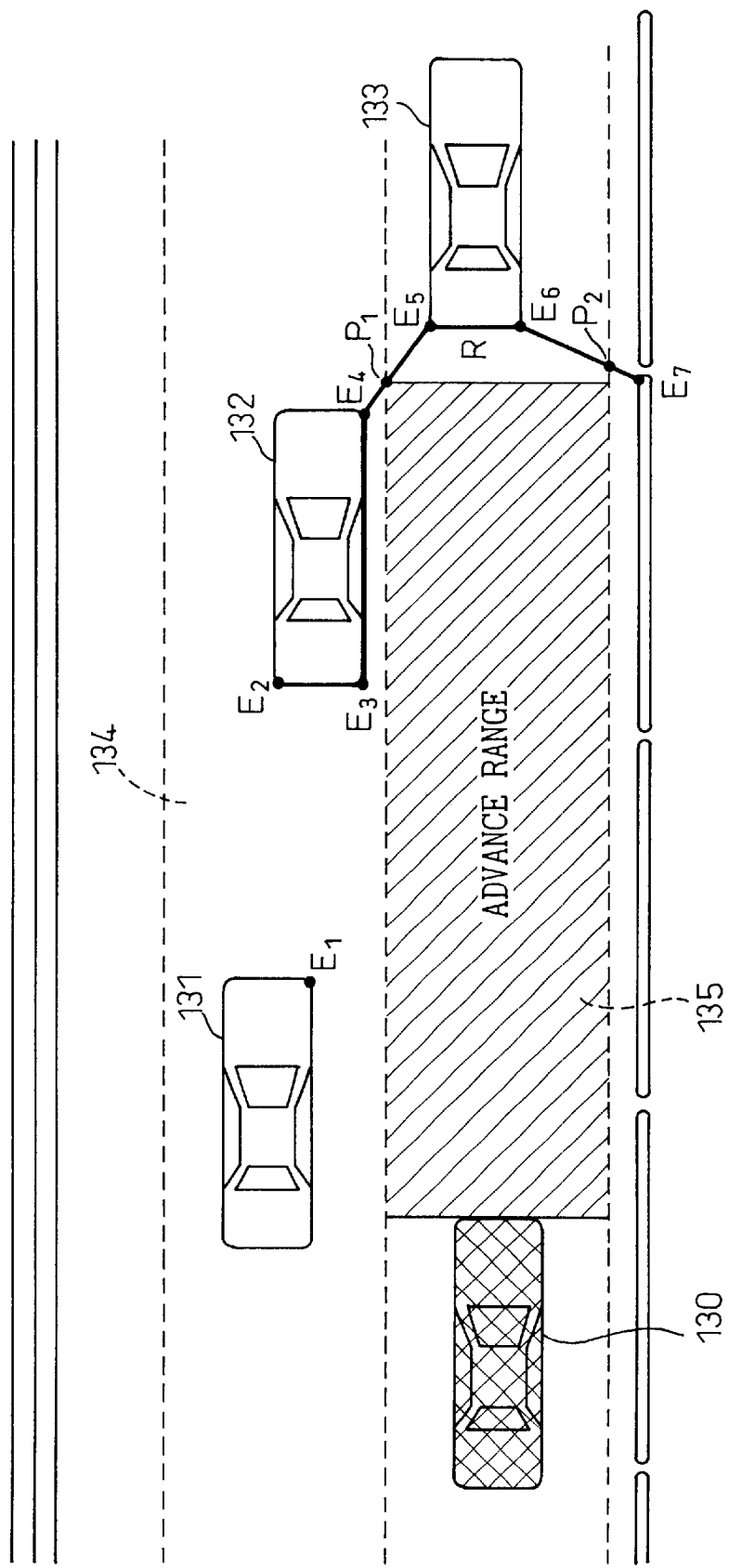

PERIPHERY MONITORING SYSTEM

CROSS-REFERENCE TO RELATED APPLICATION

This application claims priority of Japanese patent applications 2000-266393, filed Sep. 4, 2000, 2000-348032, filed Nov. 15, 2000, and 2000-363130, filed Nov. 29, 2000.

BACKGROUND OF THE INVENTION

1. Field of the Invention

The present invention relates to a periphery monitoring system, more particularly relates to a periphery monitoring system able to monitor the periphery of a vehicle, predict cut-in of another vehicle from the side, and determining a range by which the mounted vehicle may advance.

2. Description of the Related Art

One cruise control system of a vehicle is the auto cruise control (ACC) system. The ACC system controls the speed of a mounted vehicle based on the relative speed of the mounted vehicle with respect to a vehicle in front and an inter-vehicle distance between the mounted vehicle and the vehicle in front, that is, the relative distance.

That is, the ACC system is comprised of a vehicle controller for controlling an opening degree of a throttle valve and a gear ratio of a transmission and a detector for detecting the relative speed and relative distance.

To ensure safe cruising of the vehicle, however, it is important to monitor not only the vehicle in front, but also vehicles cruising at the sides of the mounted vehicle and decide on the existence of vehicles cutting in front from the sides and the range which the mounted vehicle can safely cruise based on the results of the monitoring.

Radar has been used for detecting the relative speed and relative distance of a mounted vehicle with respect to a vehicle in front in the past, but it has not been possible to accurately obtain a grasp of the conditions at the periphery of a mounted vehicle.

On the other hand, television cameras and other image sensors are suitable for obtaining a grasp of the conditions at the periphery of a mounted vehicle, but are not suitable for obtaining a grasp of the relative speed and relative distance of a mounted vehicle with respect to another vehicle.

SUMMARY OF THE INVENTION

An object of the present invention is to provide a periphery monitoring system combining radar and an image sensor and able to obtain an accurate grasp of the existence of a target at the periphery of a mounted vehicle and to determine the existence of a cut-in vehicle and a range to which a mounted vehicle may safely advance.

According to a first aspect of the invention, there is provided a periphery monitoring system provided with a target detecting means for detecting a target, a first judging means for judging which of a first region along a path of advance of a mounted vehicle, a second region comprised of a region near the outside of said first region, and a third region other than said first and second regions a target detected by said target detecting means is present in, and a first output means for outputting target detection information output from said target detecting means to a cruise control means for controlling the cruising of said vehicle based on the result of judgement of said first judging means.

According to the periphery monitoring system according to the first aspect of the invention, it becomes possible to judge which of the plurality of regions centered about the vehicle a target detected by the target detecting means is in.

According to a second aspect of the invention, there is provided a periphery monitoring system provided with a target detecting means for detecting the presence of a target in front, a distance to the target, and a relative speed of movement of the target and a cut-in predicting means for predicting a cut-in of a target into a cruising lane of the mounted vehicle based on an output of said target detecting means.

According to the periphery monitoring system according to the second aspect of the invention, it becomes possible to judge if a target detected by said target detecting means is liable to cut into a cruising lane of the vehicle.

According to a third aspect of the invention, there is provided a periphery monitoring system provided with a target detecting means for detecting the existence of a target in front, a distance to the target, and a relative speed of the target and an advance range determining means for determining a range to which a mounted vehicle may advance based on output of said target detecting means.

According to the periphery monitoring system according to the third aspect of the invention, it becomes possible to determine the advance range of the mounted vehicle based on information relating to a target detected by said target detecting means.

BRIEF DESCRIPTION OF THE DRAWINGS

These and other objects and features of the present invention will become clearer from the following description of the preferred embodiments given with reference to the accompanying drawings, in which:

FIG. 17 is a flow chart of output processing; and

FIG. 18 is a view explaining an example of display of an advance range.

DESCRIPTION OF THE PREFERRED EMBODIMENTS

Figure 1:
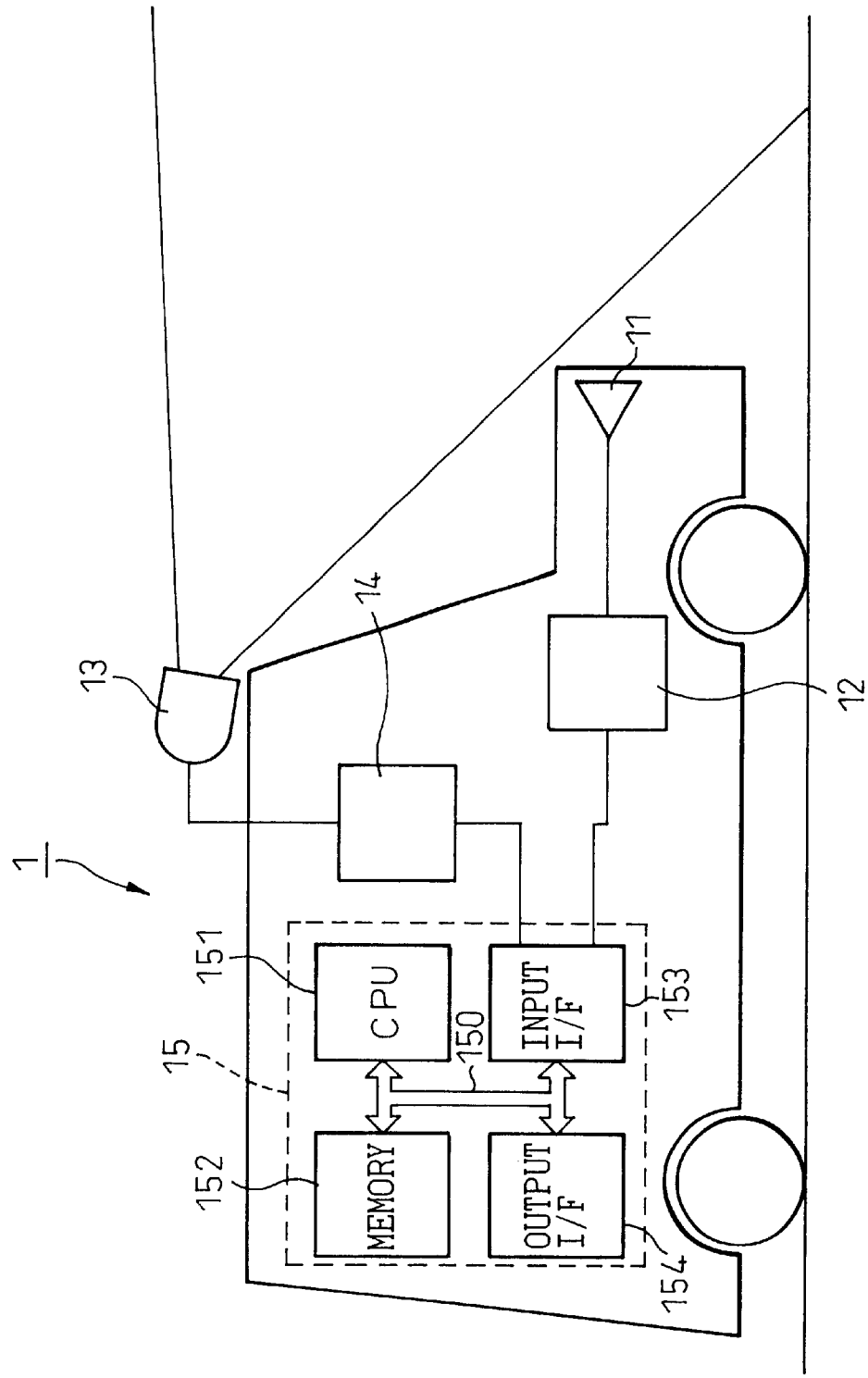
FIG. 1 is a view of the configuration of a periphery monitoring system according to the present invention.

FIG. 1 is a view of the configuration of a periphery monitoring system according to the present invention mounted in a vehicle 1.

That is, the periphery monitoring system is comprised of a radar antenna 11 installed at a front grille of a vehicle 1, a television camera 13 mounted on a roof of the vehicle 1, and a radar system 12, a video system 14, and a microcomputer system 15 mounted in the vehicle.

The radar system 12 supplies a transmission wave to the antenna 11, processes the wave received from the antenna 11, and calculates the relative speed and relative distance of the mounted vehicle to a target.

The video system 14 outputs an image captured by the television camera 13 as a video signal.

The microcomputer system 15 is comprised of a CPU 151, memory 152, input I/F (interface) 153, and output I/F 154 connected by a bus 150 and is connected to the milliwave radar system 12 and video system 14 through the input I/F 153.

Note that in the embodiments explained below, the radar system is made a milliwave radar system, but the present invention may also be applied to a scan type radar system using laser beams.

A first embodiment of a periphery monitoring system according to the present invention divides the periphery of the vehicle into a plurality of regions in accordance with the degree of importance and controls the vehicle in accordance with the regions.

Figure 2:
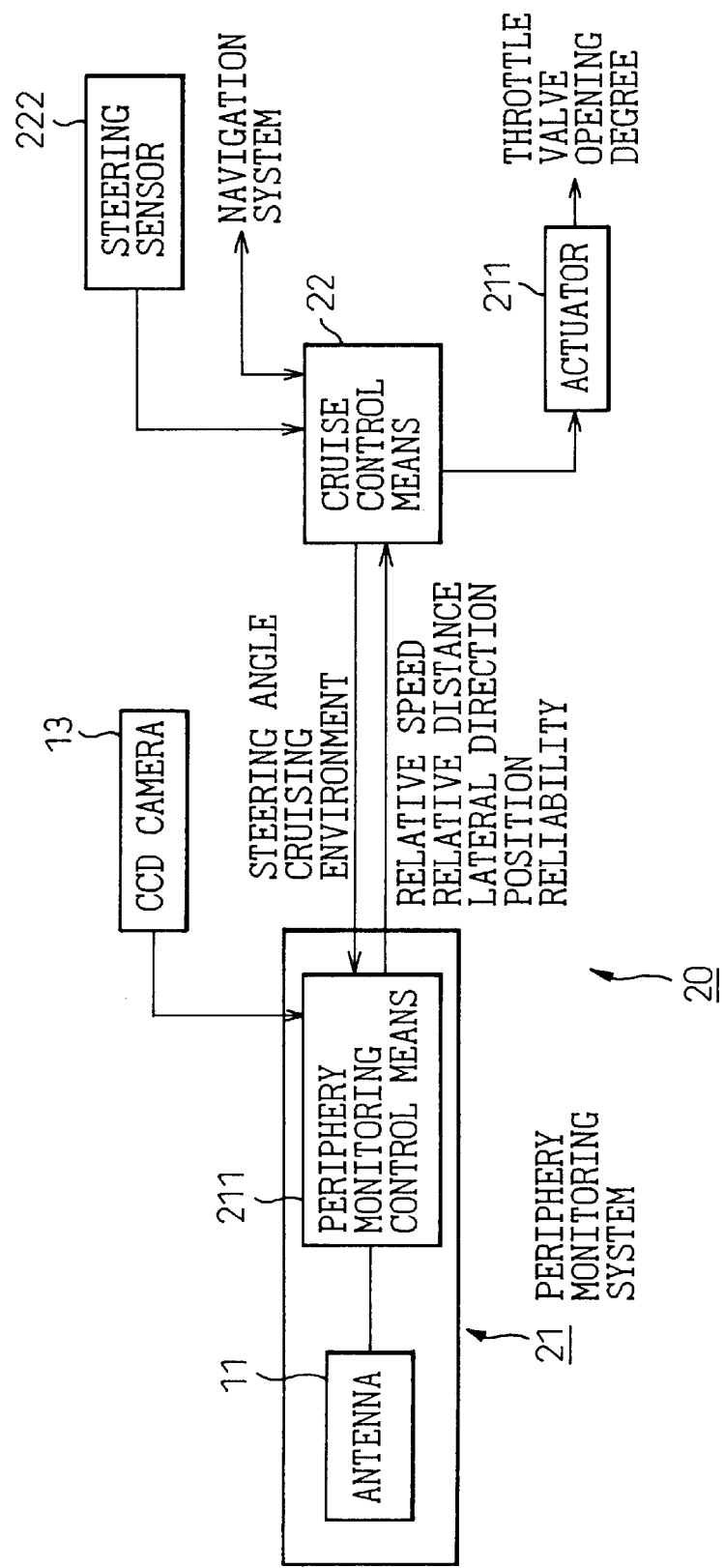
FIG. 2 is a block diagram of a cruise control system employing a periphery monitoring system according to the present invention.

FIG. 2 is a block diagram schematically showing main parts of the cruise control system employing the periphery monitoring system according to the first embodiment.

The cruise control system 20 is comprised of a periphery monitoring system 21 and a cruise control means 2. The periphery monitoring system 21 is comprised of an antenna 11 installed at the front of the vehicle and a periphery monitoring control means 211. Note that the periphery monitoring control means 211 has a television camera 13 using a pickup element connected to it. Further, the cruise control means 22 is connected to an actuator 221 driving a throttle valve and is connected to a steering sensor 222 for detecting the steering angle and to a navigation system.

Figure 3:
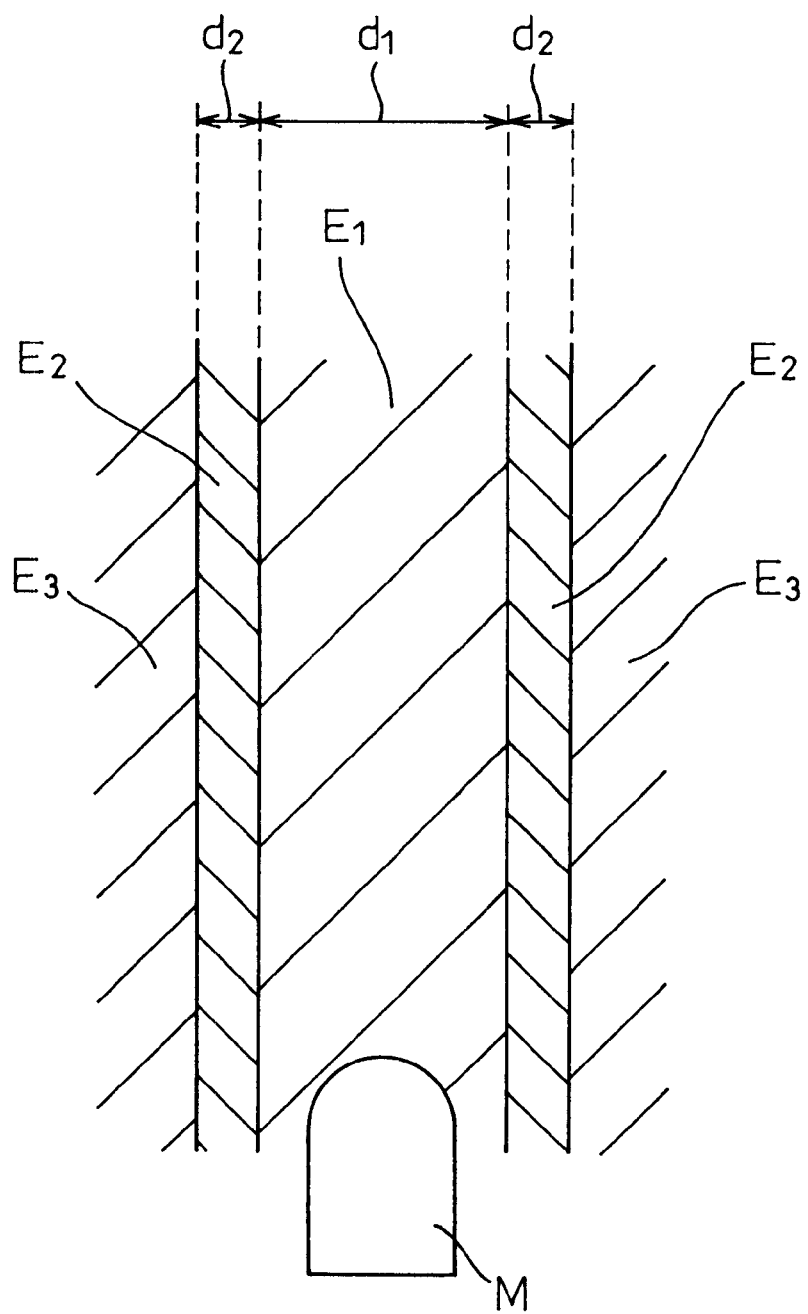
FIG. 3 is a view explaining regions.

FIG. 3 is a view explaining the case of dividing the periphery of a mounted vehicle into three regions. The region $E_1$ indicates the region inside the cruising lane of the mounted vehicle, the region $E_2$ the region immediately outside the cruising lane of the mounted vehicle, and the region $E_3$ the region other than the region $E_1$ and region $E_2$.

Figure 4:
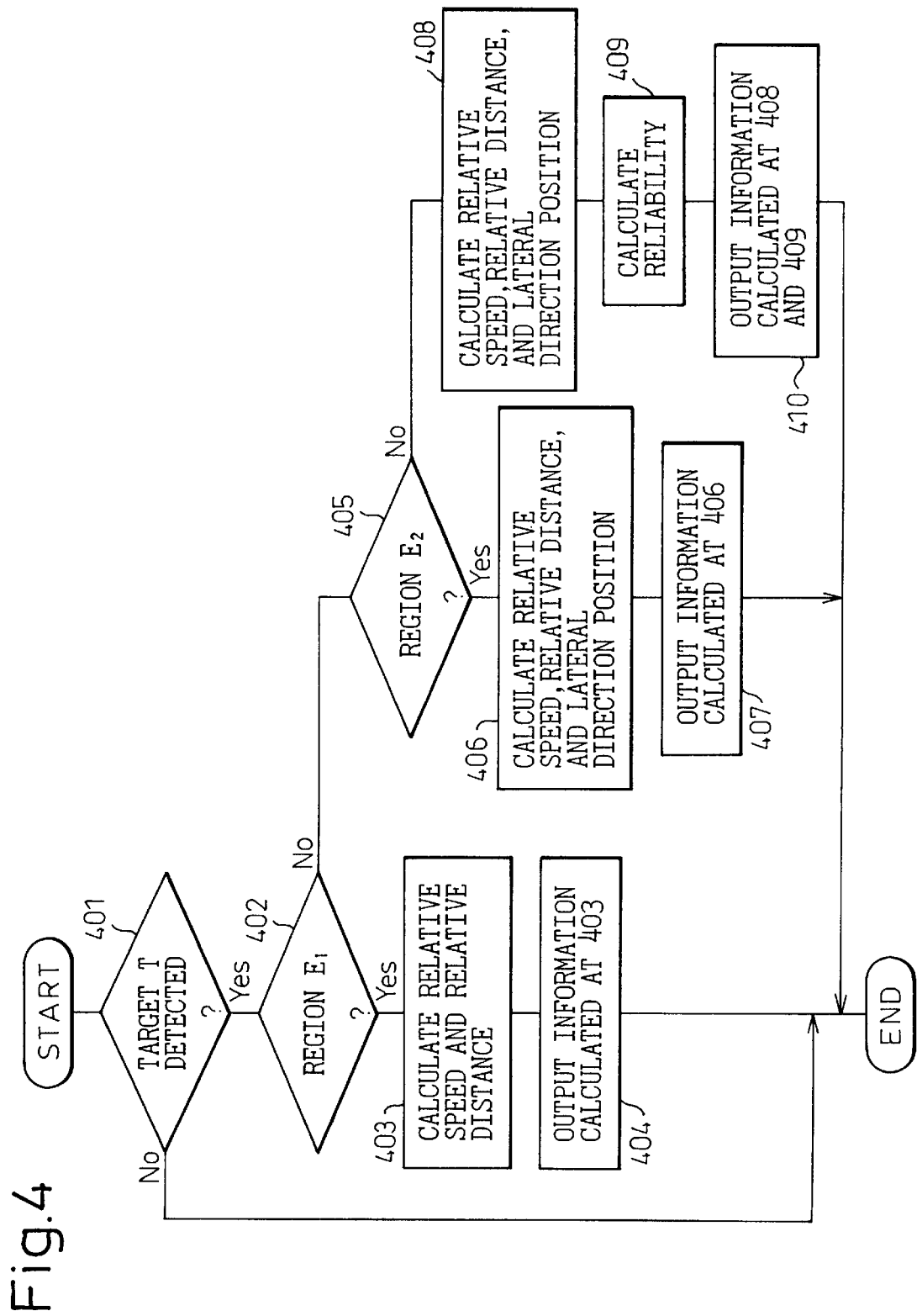
FIG. 4 is a flow chart of a periphery monitoring control routine.

FIG. 4 is a flow chart of the periphery monitoring routine. At step 401, a signal is fetched from the radar system 14 and it is judged if a target is detected.

If the judgement at step 401 is YES, that is, if a target is detected, at step 402, it is judged if the detected target is present in the region $E_1$ along the path of advance of the mounted vehicle. Note that it is possible to determine the path of advance based on a steering angle detected by the steering sensor 222 or a white line detected by the television camera 13.

If the judgement at step 402 is YES, that is, if a target is present in the region $E_1$, at step 403, the relative speed and relative distance of the target and the mounted vehicle are calculated based on the signal fetched from the antenna 11. At step 404, the relative speed and relative distance are output to the cruise control means 22.

On the other hand, when the judgement at step 402 is NO, that is, when a target is not present in the region $E_1$, at step 405, it is judged if a target is present in the region $E_2$. If the judgement at step 405 is YES, that is, if a target is present in the region $E_2$, at step 406, the relative speed and relative distance between the target and the mounted vehicle and the lateral direction position of the target are calculated based on the signal fetched from the antenna 11, and, at step 404, the relative speed and relative distance and the lateral direction position of the target are output to the cruise control means 22.

When the judgement at step 405 is NO, that is, when a target is not present in the region $E_2$, the target is assumed to be present in the region $E_3$, then at step 408, the relative speed and relative distance of the target and the mounted vehicle and the lateral direction position are calculated based on the signal fetched from the antenna 11. Further, at step 409, the reliability is calculated based on the relative speed and relative distance and the lateral direction position calculated at step 409. Finally, at step 410, the relative speed, relative distance, lateral direction position, and reliability are output to the cruise control means 22.

Note that as the method of calculating the reliability, the method of combining information relating to the reflection level of the radar wave, the pattern matching level in the image processing, and confirmation of presence over time (result of tracking for target present from the past), etc. may be mentioned.

According to the above first embodiment, based on which of the region $E_1$ along the path of advance of the mounted vehicle (for example, in the cruising lane), the region $E_2$ near the outside of the path of advance (for example, a lane outside of the cruising lane), and the region $E_3$ other than the regions $E_1$ and $E_2$ the target detected by the radar system 12 is in, the information relating to the target detected by the radar system 12 is output to the cruise control means 22 for cruise control of the mounted vehicle.

Since it is possible to differentiate the information output based on the region in which the target is present in this way, it is possible to change the information output to the cruise control means 22 in accordance with which of the regions $E_1$ to $E_3$ the target is in.

That is, when the target is in the region $E_1$, the periphery monitoring system 21 should be able to precisely detect the relative speed and relative distance of the target with respect to the mounted vehicle.

When the target is present in the region $E_3$, precision is not required for either of the relative speed, relative distance, or lateral direction position, so it is not necessary to use expensive hardware or complicated software. Therefore, it becomes possible to realize a periphery monitoring system at a low cost which can be mounted in general vehicles. Note that the width $d_1$ of the path of advance of the mounted vehicle determining the region $E_1$ is suitably set to the width of the lane, but it is also possible to use white line information captured by a television camera 13 or information on the lane width preregistered in map information of a navigation system.

Further, the width $d_1$ determining the region $E_1$ and the width $d_2$ determining the region $E_2$ may be made to be freely set by the user, but it is also possible to change the widths $d_1$ and $d_2$ based on the speed of the mounted vehicle, the relative speed and relative distance of the target, or the cruising environment (for example information on the vehicle cruising on a bridge or in a tunnel).

That is, when cruising on a bridge or in a tunnel, the bridge supports and the tunnel walls are liable to be detected as targets, so the widths $d_1$ and $d_2$ should be set narrower. Note that for bridge or tunnel information, map information of navigation systems may be used.

Further, the widths $d_1$ and $d_2$ need not be constant. They may be changed based on predetermined parameters (for example, the features of the radar system 13). For example, for a milliwave radar system, the further the target from the mounted vehicle, the lower the detection precision, so the widths $d_1$ and $d_2$ may be changed in accordance with the distance from the mounted vehicle.

Further, when a plurality of targets are detected by the radar system 13, the periphery monitoring control means 211 may output various information on the target with the highest degree of hazard to the cruise control means 22.

Note that the degree of hazard may be calculated based on the relative speed, relative distance, and lateral direction position.

Figure 5:
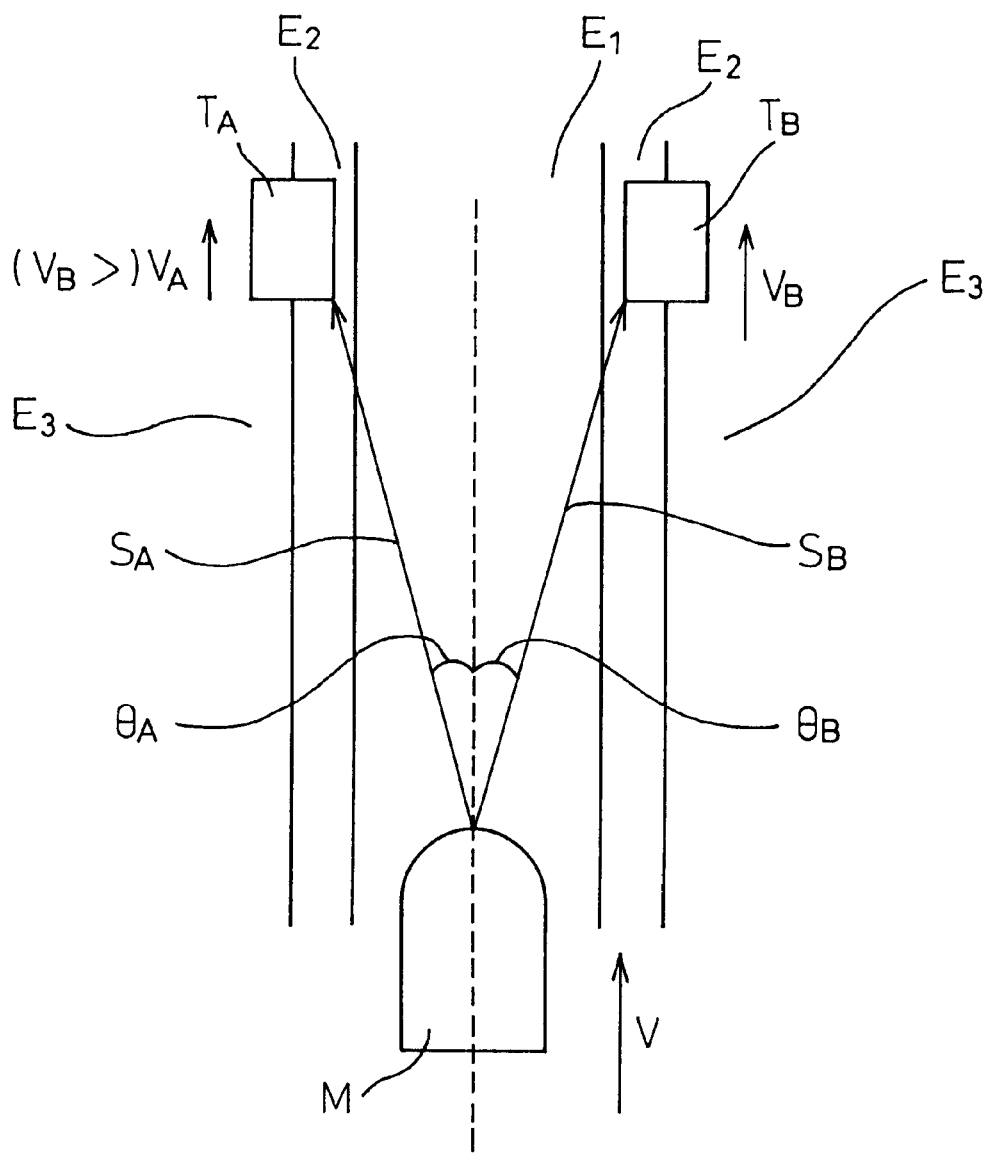
FIG. 5 is a view explaining a degree of hazard.

FIG. 5 is a view explaining the case where vehicles $T_A$ and $T_B$ are present in front of the mounted vehicle M. Assume that the relative distances between the mounted vehicle M and the vehicles $T_A$ and $T_B$ are the same ($S_A=S_B$ and $\theta_A=\theta_B$), but the relative speed $\Delta V_A$ of the vehicle $T_A$ is smaller than the relative speed $\Delta V_B$ of the vehicle $T_B$. In this case, since the degree of hazard of the vehicle $T_A$ is greater than that of the vehicle $T_B$, cruise control should be performed based on the information of the vehicle $T_A$.

Further, in the first embodiment, the periphery was divided into the three regions $E_1$ to $E_3$, but it is also possible to divide it into two regions of the region $E_1$ and a region other than the same or divide it into four or more regions.

A second embodiment of the periphery monitoring system according to the present invention predicts if a vehicle cruising in the front will cut into the range of advance of the mounted vehicle.

Figure 6:
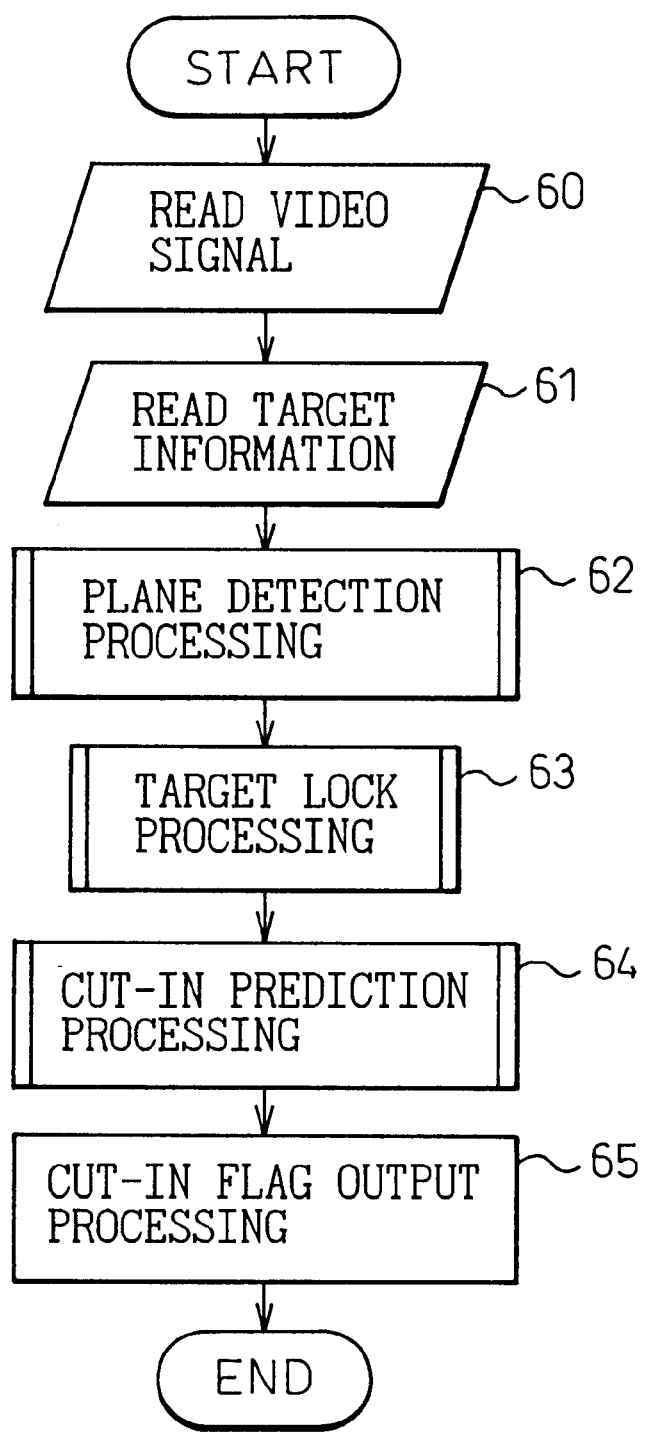
FIG. 6 is a flow chart of a cut-in prediction routine.

FIG. 6 is a flow chart of a cut-in prediction routine stored in the memory 152 and executed by the CPU 151. The routine is executed by interruption every predetermined time interval (for example, 100 milliseconds).

Figure 7:
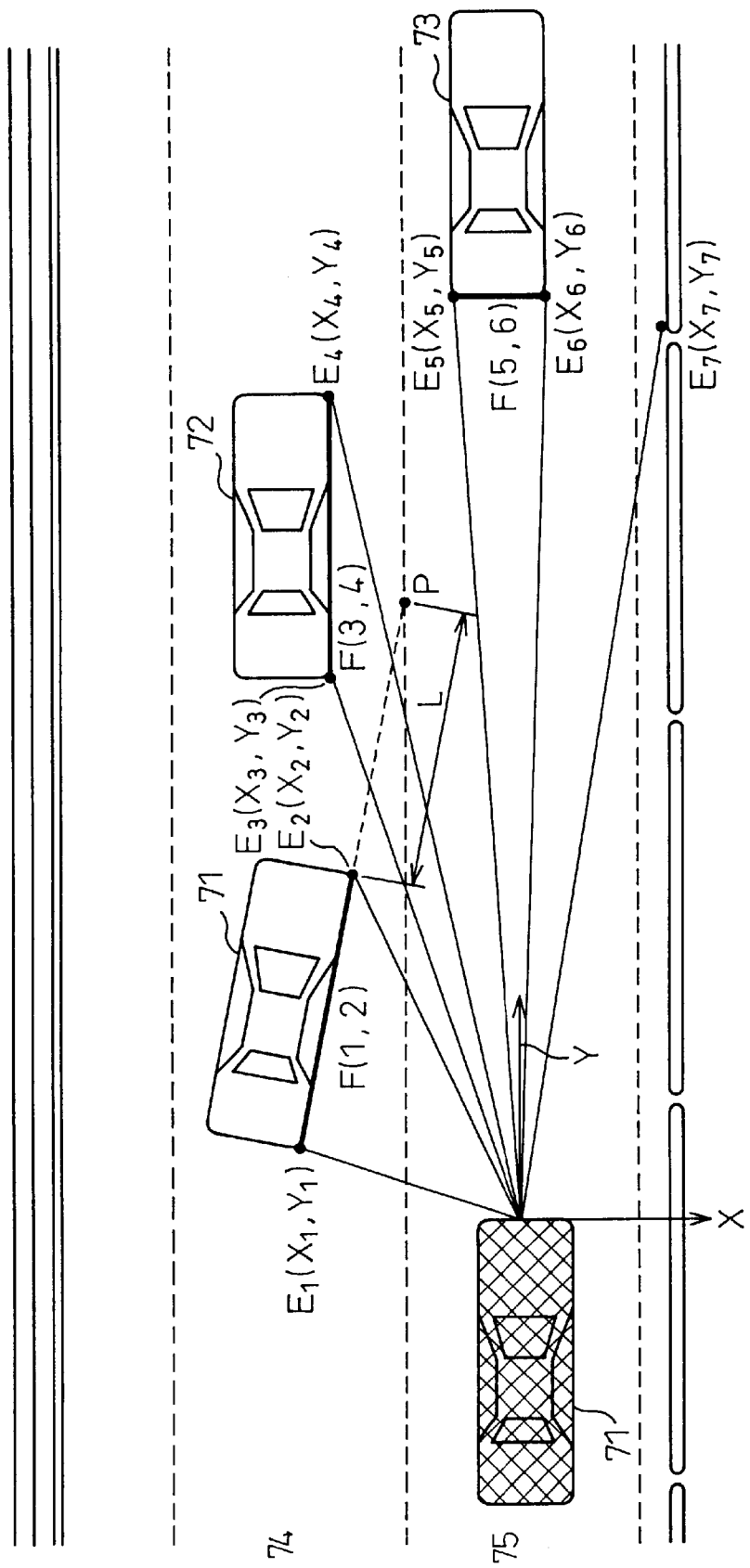
FIG. 7 is a view explaining a cut-in state.

FIG. 7 is an explanatory view for explaining the processing of the cut-in prediction routine and shows the state of three vehicles 71 to 73 in front of the mounted vehicle 70.

The mounted vehicle 70 and the vehicle 73 are assumed to be cruising in the passing lane, while the vehicles 71 and 72 are assumed to be cruising in the left lane 55. Further, the vehicle 71 cruising to the immediate front left of the mounted vehicle 70 is trying to cut in front of the mounted vehicle 70. The processing of the cut-in predicting routine will be explained with reference to FIG. 7.

At step 60, the video signal output from the video system 14 is read, while at step 61, the target (target) information output from the radar system 12 is read.

Next, first plane detection processing is executed at step 62, target lock processing at step 63, prediction processing at step 64, and cut-in flag output processing at step 65, then the routine ended. The details of the processing other than the cut-in flag output processing will be explained below.

Figure 8:
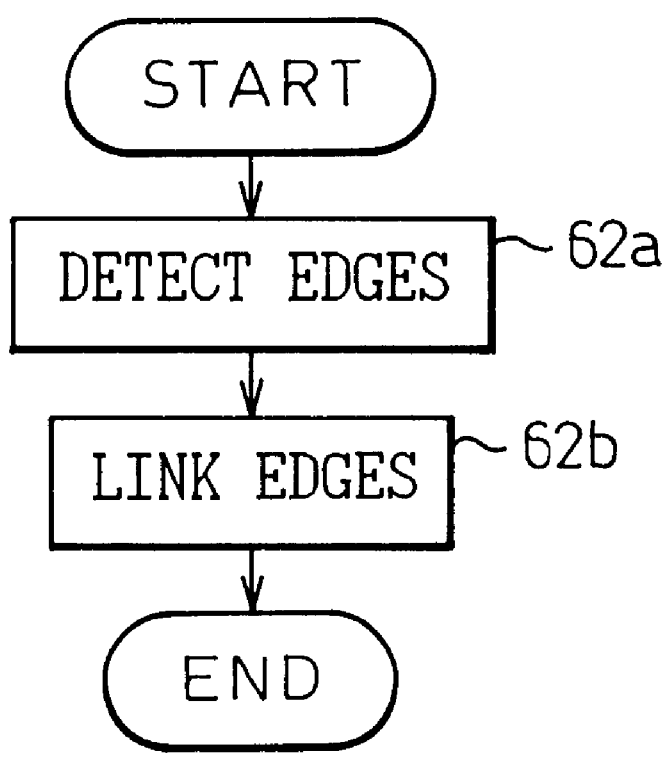
FIG. 8 is a flow chart of first plane detecting processing.

FIG. 8 is a flow chart of the first plane detection processing executed at step 62 of the cut-in prediction routine. At step 62a, edges are detected from the images transmitted from the video system. Further, numbers are assigned to the detected edges for example from the left on and the coordinates and relative speed of the edges are calculated.

FIG. 7 shows the state of detection of seven edges $E_1=(X_1,Y_1)$, $E_2=(X_2,Y_2)$, $E_3=(X_3,Y_3)$, $E_4=(X_4,Y_4)$, $E_5=(X_5,Y_5)$, $E_6=(X_6,Y_6)$, and $E_7=(X_7,Y_7)$, in order from the left by the X-Y coordinates having the front center of mounted vehicle as the origin.

Next, at step 62b, the edges detected are linked. That is, it is judged if a target is detected in the plane connecting the edges, the two end edges of the plane in which a target is detected are linked, the value of the plane F(i,j) connecting the related edges is set to "1", the value of the plane F(i,j) connecting nonrelated edges is set to "0", and the routine is ended.

That is, in the state of FIG. 7, F(1,2), F(3,4), and F(5,6) are set to "1", while F(2,3), F(4,5), and F(6,7) are set to "0".

Figure 9:
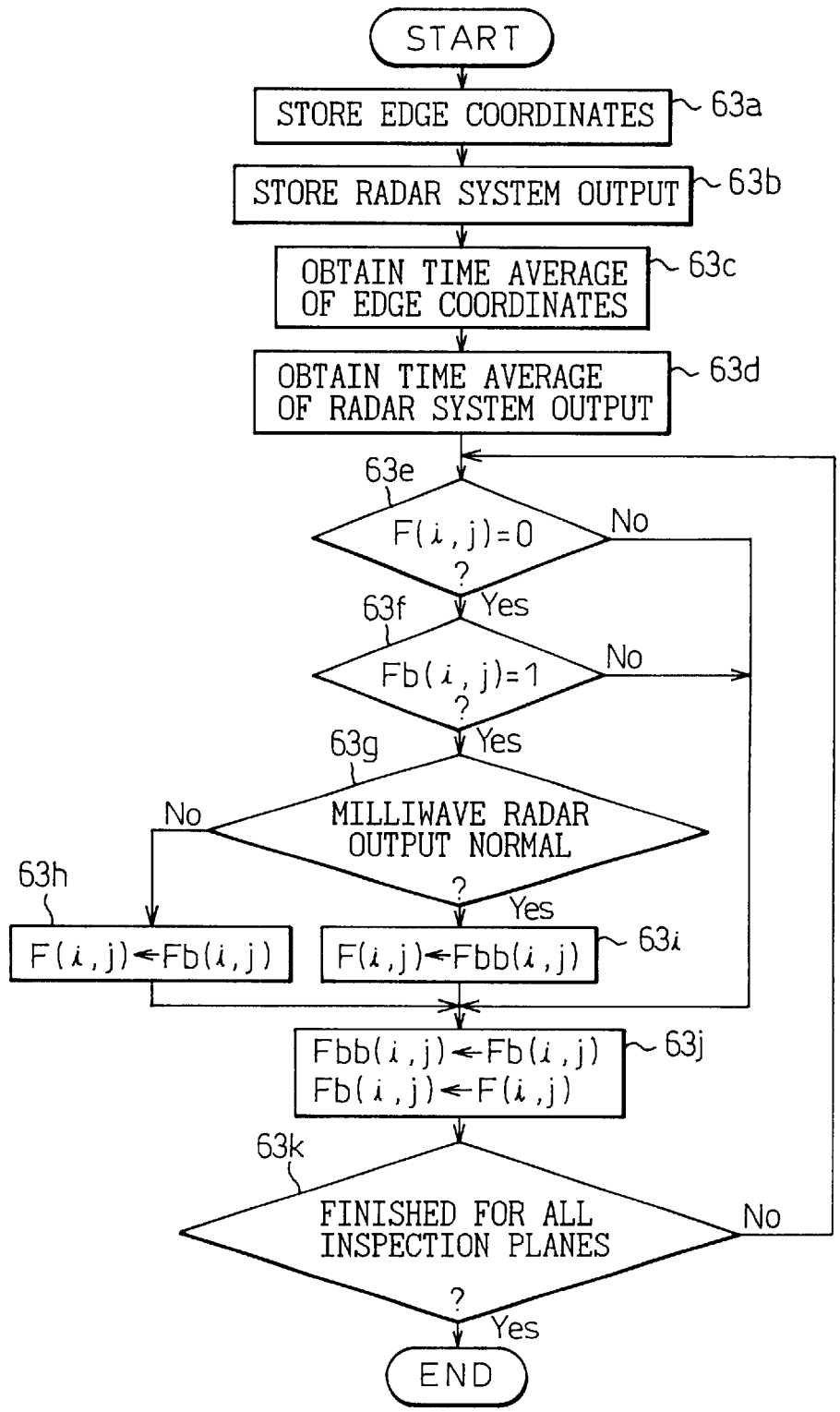
FIG. 9 is a flow chart of target lock processing.

FIG. 9 is a flow chart of the target lock processing executed at step 23 of the cut-in prediction routine. This is executed in accordance with need to prevent a mistaken determination.

First, at step 63a, five coordinates of seven edges are stored every execution cycle (for example, every 100 milliseconds). At step 63b, five sets of target information output from the radar system 12 are stored for every predetermined multiple of the execution cycle. For example, if the predetermined multiple is 2, in this embodiment, the target information is stored every 200 milliseconds.

At step 63c, the time average value for 500 milliseconds is calculated based on the five coordinates stored at step 23a as the average edge coordinates. At step 63d, the time average value of 1 second is calculated based on the five sets of data stored at step 63b as the average radar system output.

Next, at step 63e, it is judged if the current value of the inspection plane F(i,j) is "0", that is, if the mounted vehicle can pass through the inspection plane F(i,j). When the judgement is NO, the routine proceeds to step 63j.

Conversely, when the judgement at step 63e is YES, that is, when the current value of the inspection plane F(i,j) is "0", at step 63f, it is judged if the previous value Fb(i,j) of the inspection plane F(i,j) was "1".

When the judgement at step 63f is NO, that is, when the previous value Fb(i,j) is "0", the routine proceeds to step 63j.

Conversely, when the judgement at step 63f is YES, that is, when the previous inspection plane value Fb(i,j) is "1", it is deemed that the inspection plane has disappeared and the following target lock processing is executed.

That is, first, at step 63g, it is judged if the milliwave radar output is normal or not.

When the judgement at step 63g is NO, that is, when the milliwave radar loses the target, the current value of the inspection plane F(i,j) is set to the previous value Fb(i,j) and the routine proceeds to step 63j.

Conversely, when the judgement at step 63g is YES, that is, when the video system loses the target, the inspection plane F(i,j) is set to the twice previous value Fbb(i,j) and the routine proceeds to step 63j.

At step 63j, the twice previous value Fbb(i,j) is updated by the previous value Fb(i,j) and the previous value Fb(i,j) is updated by the current value F(i,j) at predetermined intervals (for example, 500 milliseconds).

Finally, at step 63k, it is judged if the target lock processing has been completed for all planes. When the judgement is NO, the routine returns to step 63e. Conversely, when the judgement at step 63k is YES, the processing is ended.

Figure 10:
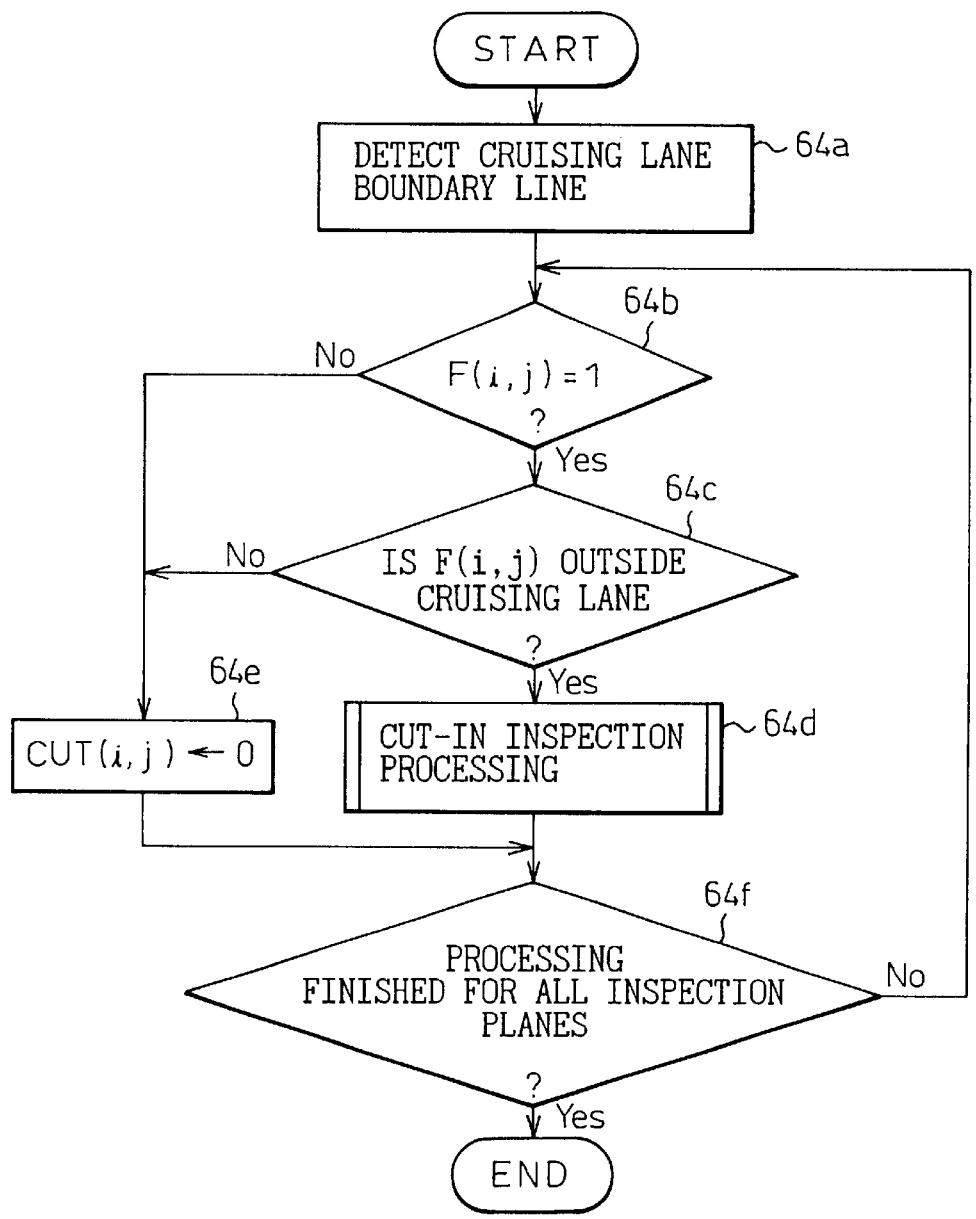
FIG. 10 is a flow chart of prediction processing.

FIG. 10 is a flow chart of the prediction processing executed at step 64 of the cut-in prediction routine. This detects a boundary line of the cruising lane of the mounted vehicle 1 at step 64a.

For the detection of the edges, known methods can be applied, but it is advantageous to use the method explained in the first embodiment.

Next, at step 64b, it is judged if the value of the inspection plane F(i,j) is "1". When the judgement is YES, at step 64c, it is judged if the inspection plane F(i,j) is present outside the cruising lane of the mounted vehicle 1.

When the judgement at step 64c is YES, that is, when the inspection plane (i,j) is outside the cruising lane of the mounted vehicle 1, at step 64d, the cut-in inspection processing is executed and the routine proceeds to step 64f. Note that the content of the cut-in inspection processing will be explained later.

When the judgement at step 64b is NO, that is, when the value of the inspection plane F(i,j) is "0" and when the judgement at step 64c is NO, that is, when the inspection plane (i,j) is inside the cruising lane of the mounted vehicle 1, at step 64e, a prediction flag CUT(i) is set to "0" to indicate that cut-in will not occur and the routine proceeds to step 64f.

At step 64f, it is judged if the prediction processing has been executed for all inspection planes. When the judgement is NO, the routine returns to step 64b. Conversely, when the judgement at step 64f is YES, the processing is ended.

Figure 11:
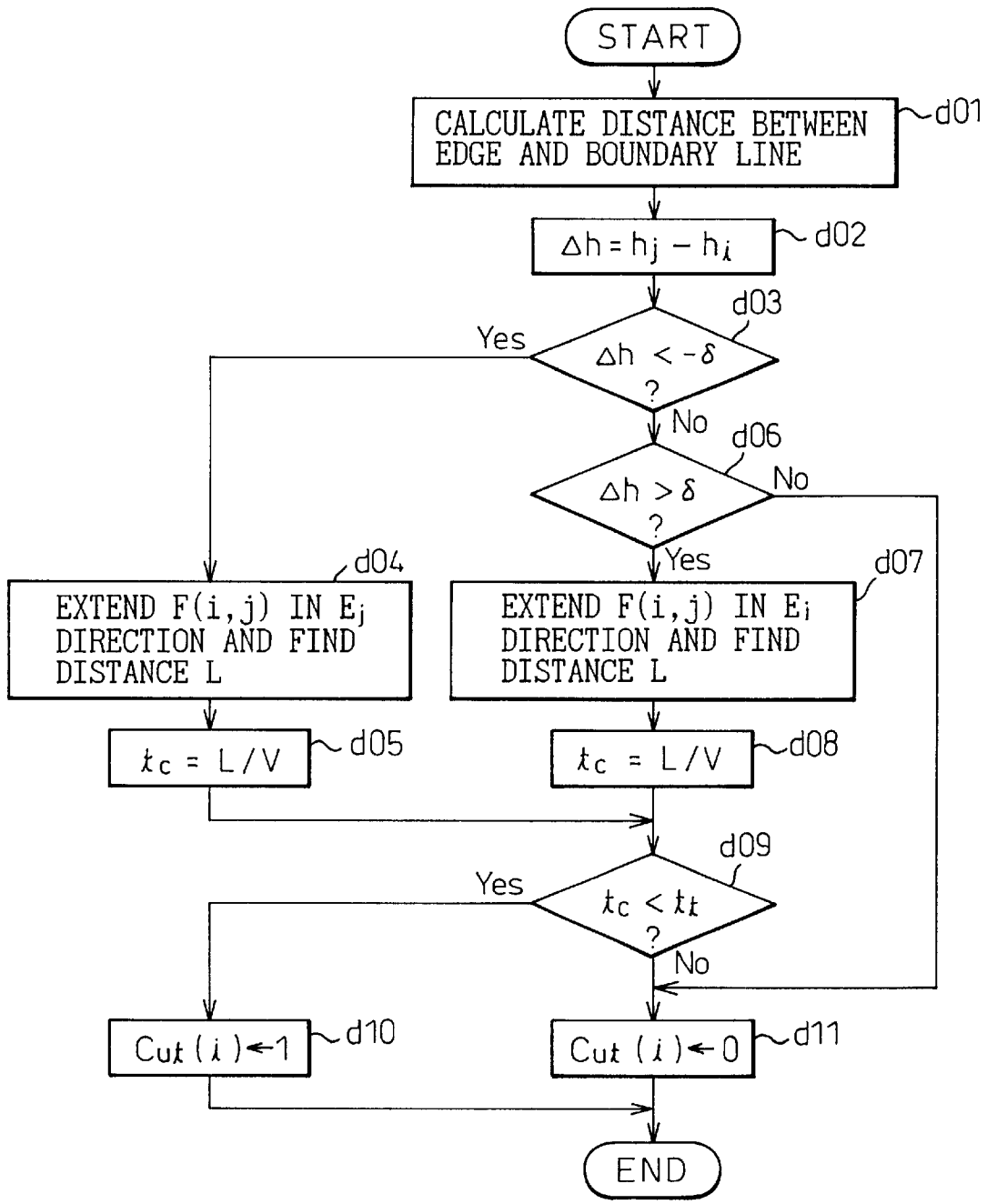
FIG. 11 is a flow chart of cut-in inspection processing.

FIG. 11 is a flow chart of the cut-in inspection processing executed at step 64d of the prediction processing. At step d01, it calculates the lengths $h_i$ and $h_j$ of the vertical lines descended from the two end edges $E_i$ and $E_j$ of the inspection plane F(i,j) outside of the cruising lane of the mounted vehicle to the boundary of the cruising lane. Further, at step d02, it calculates the difference $\Delta h$ of the lengths of the vertical lines $h_j$ and $h_i$.

At step d03, it is judged if $\Delta h$ is smaller than $-\delta$ (where, $\delta$ is a predetermined positive value), that is, if the edge $E_j$ is closer to the cruising lane boundary line than the edge $E_i$.

When the judgement at step d03 is YES, that is, when the edge $E_j$ is closer to the cruising lane boundary line than the edge $E_i$, at step d04, the inspection plane F(i,j) is extended in the edge $E_j$ direction, the intersection of the extension and the cruising lane boundary line is found, and the distance between the edge $E_j$ and the intersection P is calculated.

At step d05, the distance L is divided by the relative speed v detected by the radar system, the time $t_c$ until the inspection plane F(i,j) cuts into the cruising lane is calculated, and the routine proceeds to step d09.

On the other hand, when the judgement at step d03 is NO, that is, when the edge $E_j$ is not closer to the cruising lane boundary line than the edge $E_i$, at step d06, it is judged that $\Delta h$ is larger than $\delta$.

When the judgement at step d06 is YES, that is, when the edge $E_i$ is closer to the cruising lane boundary line than the edge $E_j$, at step d07, the inspection plane F(i,j) is extended in the edge $E_i$ direction, the intersection of the extension and the cruising lane boundary line is found, and the distance L between the edge $E_i$ and the intersection P is calculated.

At step d08, the distance L is divided by the relative speed v detected by the radar system, the time $t_c$ until the inspection plane F(i,j) cuts into the cruising lane is calculated, and the routine proceeds to step d09.

At step d09, it is judged if the time $t_c$ is less than a predetermined threshold time $t_r$. When the judgement is YES, at step d10, the cut-in flag CUT(i) is set to "1" and the routine is ended.

Conversely, when the judgement at step d09 is NO, that is, when the time $t_c$ is more than a predetermined threshold time $t_r$, and when the judgement at step d06 is YES, that is, when the inspection plane is substantially parallel to the cruising lane boundary line, the cut-in flag CUT(i) is set to "0" at step d11 and the routine is ended.

In the above cut-in inspection processing, the threshold time $t_r$ is handled as a constant value, but it is also possible for the driver to set it in accordance with his or her preference. In this case, when desirable for the driver to detect cut-in early, the threshold time $t_r$ is set long, while in other cases, the threshold time $t_r$ is set short.

Further, it is also possible to set the threshold time $t_r$ as a decreasing function of the speed of the mounted vehicle. In this case, when the mounted vehicle is high in speed, the threshold time $t_r$ is set large. When the mounted vehicle is low in speed, the threshold time $t_r$ is set small.

Further, it is also possible to set the threshold time $t_r$ as an increasing function of the inter-vehicle distance. In this case, when the inter-vehicle distance is small, the threshold time $t_r$ is set large. When the inter-vehicle distance is large, the threshold time $t_r$ is set small.

Note that the method of use of the cut-in flag is not particularly limited. For example, it is possible to sound an alarm, display a message, apply a brake, or perform other control.

A third embodiment of the periphery monitoring system according to the present invention determines the range in which the mounted vehicle can advance.

Figure 12:
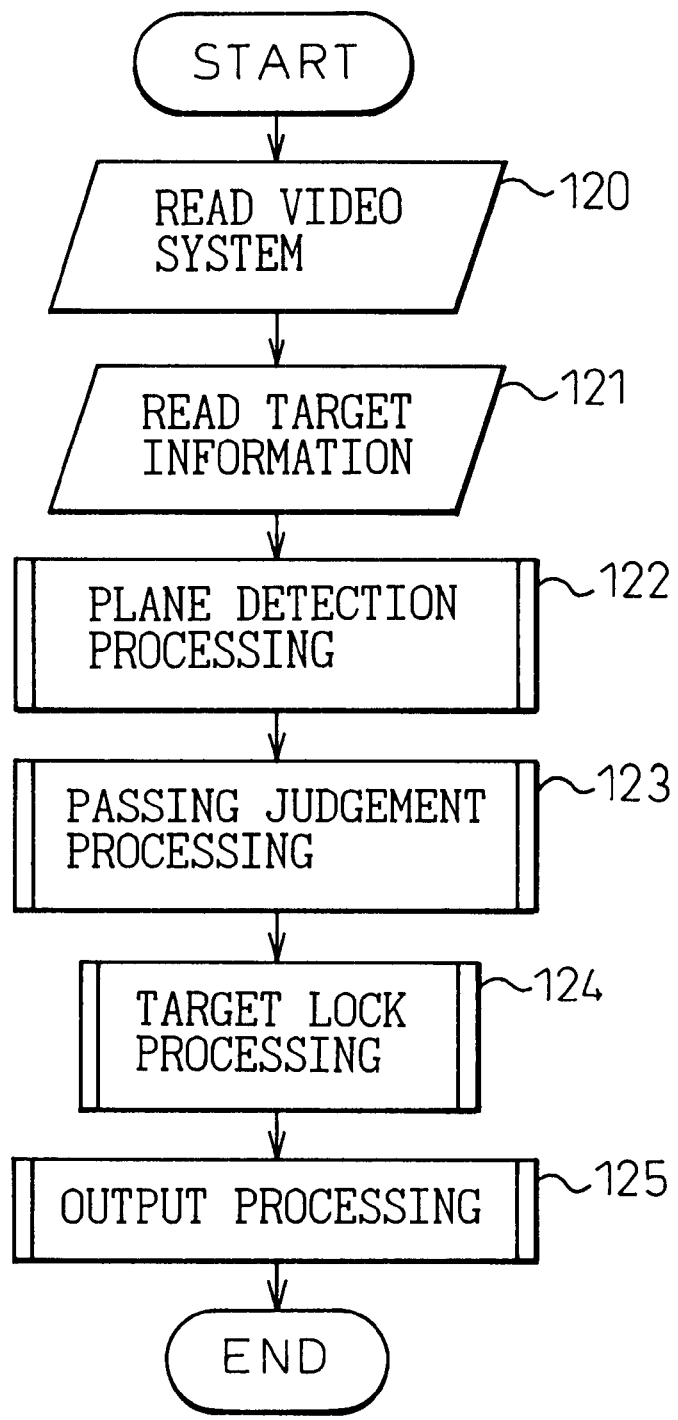
FIG. 12 is a flow chart of an advance range routine.

FIG. 12 is a flow chart of the advance range determination routine stored in the memory 152 and executed by the CPU 151. The routine is executed by interruption every predetermined time interval (for example, 100 milliseconds).

Figure 13:
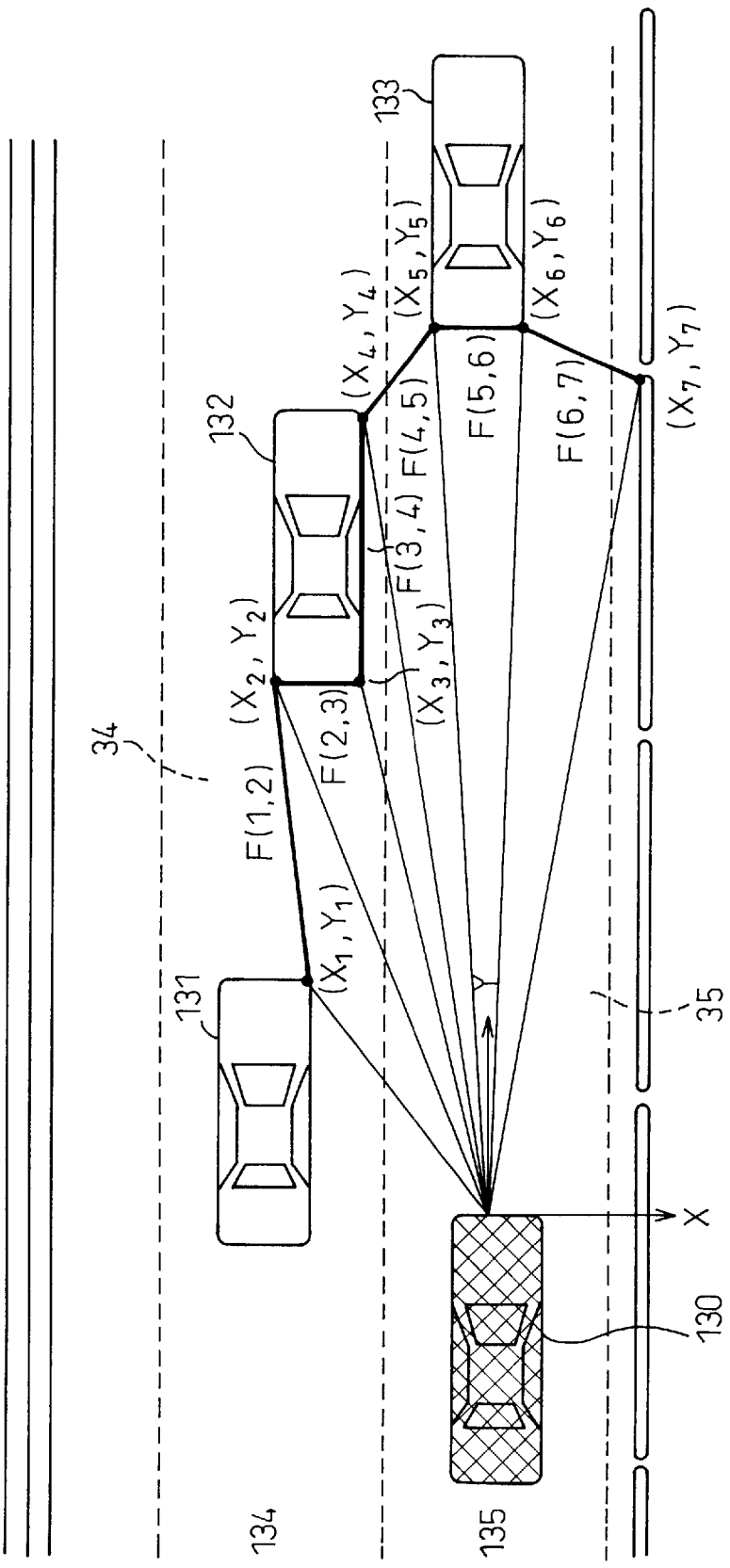
FIG. 13 is a view explaining an advance range.

FIG. 13 is an explanatory view for explaining the processing of the advance range determination routine and shows the state of three vehicles 131 to 133 driving in front of mounted vehicle 130.

The mounted vehicle 130 and the vehicle 133 are assumed to be driving in the cruising lane 134, while the vehicles 131 and 132 are assumed to be driving in the right passing lane 135. Below, the processing of the advance range determination routine will be explained with reference to FIG. 13.

At step 120, the video signal output from the video system 14 is read, while at step 121, the target (target) information output from the radar system 12 is read.

Next, second plane detection processing is executed at step 122, passage judgement processing at step 123, target lock processing at step 124, and output processing at step 125, then the routine ended. The details of the processing will be explained below.

Figure 14:
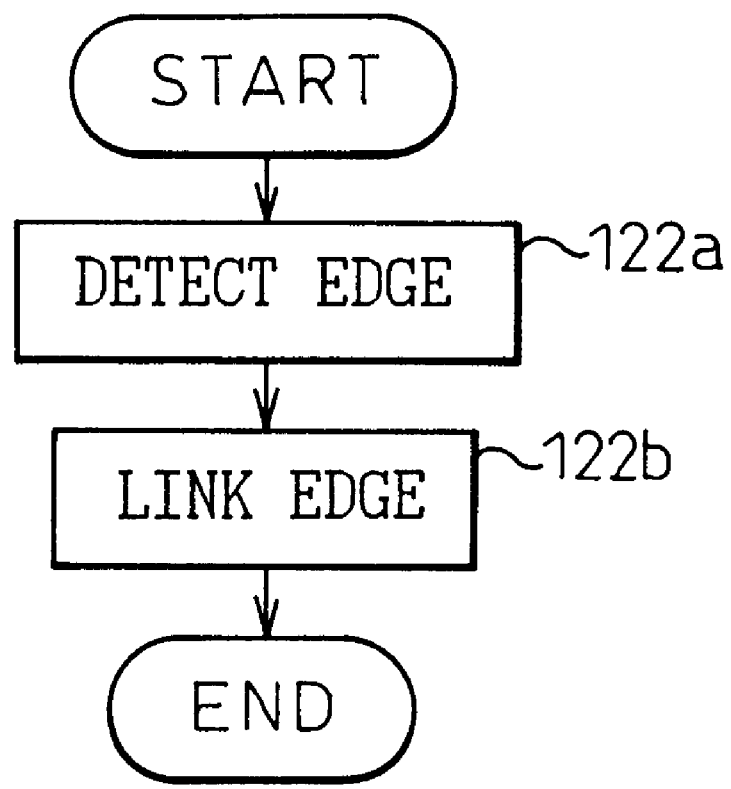
FIG. 14 is a flow chart of second plane detection processing.

FIG. 14 is a flow chart of the second plane detection processing executed at step 122 of the advance range determination routine. Edges transmitted from the video system at step 122a are detected. Further, numbers are assigned to the detected edges for example from the left on and the coordinates and relative speeds of the edges are calculated.

FIG. 13 shows the state of detection of seven edges $E_1=(X_1,Y_1)$, $E_2=(X_2,Y_2)$, $E_3=(X_3,Y_3)$, $E_4=(X_4,Y_4)$, $E_5=(X_5,Y_5)$, $E_6=(X_6,Y_6)$, and $E_7=(X_7,Y_7)$, in order from the left by the X-Y coordinates having the front center of the mounted vehicle as the origin.

Next, the edges detected at step 122b are linked. That is, it is judged if there is a target in a plane connecting the edges, the edges at the two ends of the plane where a target is detected are linked, and the routine is ended.

For the detection and linkage of the edges, known methods can be applied, but it is preferable to apply the method explained in the first embodiment. According to this method, it becomes possible to add not only the coordinates of the edges detected, but the reliability of the edges.

That is, the reliability of the edges is calculated based on the information from the milliwave radar with respect to the edges and the information from the video system.

Figure 15:
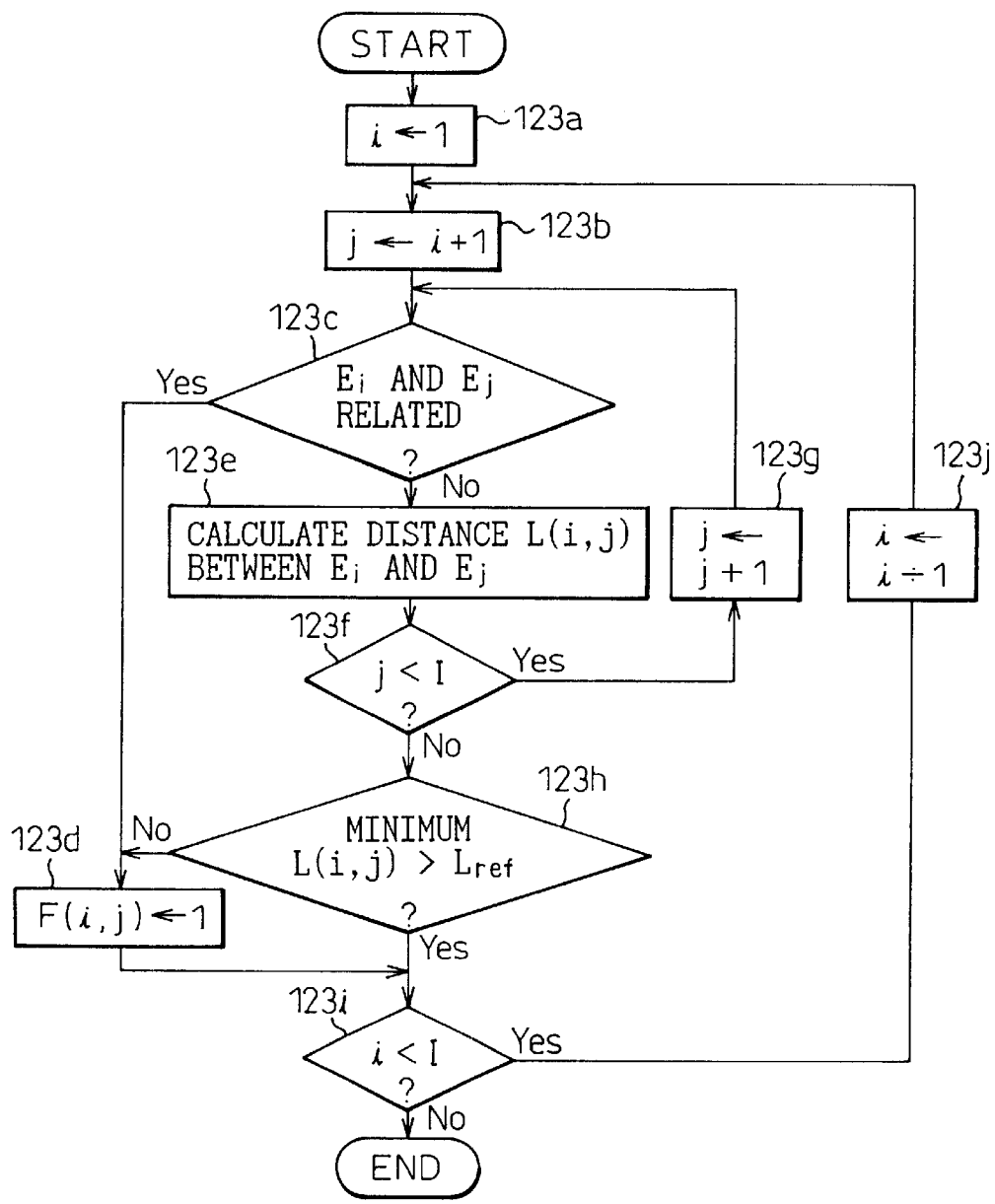
FIG. 15 is a flow chart of passage judgement processing.

FIG. 15 is a flow chart of the passage judgement processing executed at step 123 of the advance range determination routine. At step 123a, i is set to an initial value "1", while at step 123b, the index j indicating the number of the edge is similarly set to an initial value i+1.

At step 123c, it is judged if there is an edge $E_j$ related to the edge $E_i$. When the judgement at step 123c is YES, that is, when there is a related edge, at step 123d, the value of F(i,j) is set to "1" to indicate that mounted vehicle cannot pass through the plane F(i,j) and the routine proceeds to step 23i.

On the other hand, when the judgement at step 123c is NO, that is, when there is no related edge, at step 123e, the distance L(i,j) between the $E_i$ and the edge $E_j$ is calculated.

At step 123f, it is judged if the index j is less than the total number I of edges detected.

When the judgement at step 123f is YES, that is, when the index j is less than the total number I of the edges detected, at step 123g, the index j is incremented and the routine returns to step 123c.

Conversely, when the judgement at step 123f is NO, that is, when the index j becomes at least the total number I of edges detected, the routine proceeds to step 123h.

At step 123h, it is judged if the smallest distance L(i,j) among the distances L(i,j) calculated at step 123e (where i+1≦j≦I) is a predetermined value $L_{ref}$ or more, that is, if mounted vehicle can pass through the plane F(i,j) connecting the edges $E_i$ and $E_j$.

When the judgement at step 12h is NO, that is, when mounted vehicle cannot pass through the inspection plane F(i,j), at step 123d, the value of F(i,j) is set to "1" and the routine proceeds to step 123i.

Conversely, when the judgement at step 123h is YES, that is, when mounted vehicle can pass through the inspection plane F(i,j), the routine proceeds to step 123i.

At step 123i, it is judged if the index i is less than the total number I of edges detected. When the judgement is YES, at step 123j, the index i is incremented and the routine returns to step 123b.

Conversely, when the judgement at step 123i is NO, that is, when the index i is the total number I of edges detected or more, the processing is ended.

As a result of the processing, in the state in FIG. 13, F(2,3), F(3,4), F(4,5), F(5,6), and F(6,7) are set to "1".

Figure 16:
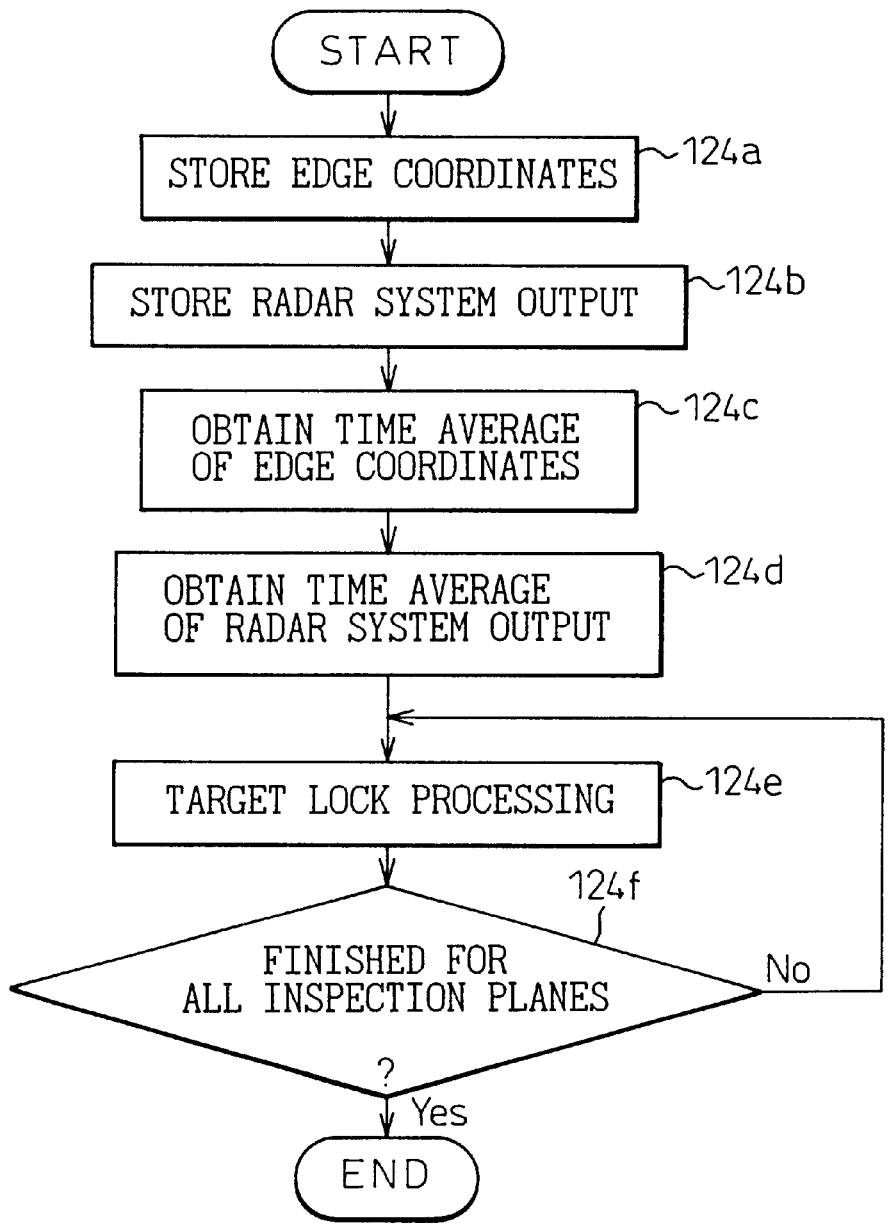
FIG. 16 is a flow chart of target lock processing.

FIG. 16 is a flow chart of the target lock processing executed at step 124 of the advance range determination routine and is executed when necessary for preventing a mistaken decision.

First, at step 124a, five coordinates of seven edges are stored for each execution cycle (for example, for each 100 milliseconds), while at step 124b, five sets of target information output from the radar system 12 are stored for each predetermined multiple of the execution cycle. For example, if the predetermined multiple is 2, in this embodiment, the target information is stored for every 200 milliseconds.

At step 124c, a time average value of 500 milliseconds is calculated based on five coordinates stored at step 124a as average edge coordinates, while at step 124d, the time average value of 1 second is calculated based on five sets of data stored at step 124b as the average radar system output.

Next, at step 124e, it is judged if there are edges $E_i$, $E_j$ corresponding to the previous edges $E_{ib}$, $E_{jb}$ judged to be related, that is, if there are edges estimated to be edges of the same detected object. When there are corresponding edges $E_i$, $E_j$, it is estimated that there is a high possibility of a target existing the present time as well in the plane F(i,j) connecting the edges, so regardless of the presence or absence of relevance of the edges $E_i$, $E_j$, that is, if a target is detected in the F(i,j), the value of F(i,j) is set to "1".

Finally, at step 124f, it is judged if the target lock processing of step 124e has been completed for all previous edges. If the judgement is NO, the routine returns to step 124e. Conversely, if the judgement is YES at step 124f, the processing is ended.

FIG. 17 is a flow chart of the output processing executed at step 125 of the advance range determination routine. At step 125a, the minimum Y-coordinate $Y_{min}$ is initiated, while at step 125b, the boundary line of the lane in which mounted vehicle is cruising is detected. Note that for the detection of the boundary line, a known method can be applied. In particular, it is preferable to apply the method explained in the first embodiment.

At step 125c, it is judged if the inspection plane F(i,j)=1 is present inside the cruising lane of the mounted vehicle.

Further, when the judgement at step 125c is YES, that is, when the inspection plane F(i,j)=1 is present in the cruising lane of the mounted vehicle, the minimum value of the edges $E_i$ and $E_j$ and the minimum Y-coordinate $Y_{min}$ is set to $Y_{min}$, then the routine proceeds to step 125k.

$$Y_{min} \leftarrow \text{Min}(Y_i, Y_j, Y_{min})$$

Conversely, when the judgement at step 125c is NO, that is, when the inspection plane F(i,j)=1 is not in the cruising lane of the mounted vehicle, the routine proceeds to step 125e, where it is judged if one edge $E_j$ of the inspection plane F(i,j)=1 is present in the cruising lane of the mounted vehicle.

When the judgement at step 125e is YES, that is, when the edge $E_j$ is present in the cruising lane of the mounted vehicle, at step 125f, the coordinates $(X_0, Y_0)$ of the intersection P between the inspection plane F(i,j)=1 and the boundary line of the cruising lane of the mounted vehicle are calculated, while at step 125g, the minimum value of the Y-coordinate $Y_i$ of the edge $E_i$, the Y-coordinate $Y_0$ of the intersection $P_0$, and the minimum Y-coordinate $Y_{min}$ is set to $Y_{min}$ by the following formula, then the routine proceeds to step 125k.

$$Y_{min} \leftarrow \text{Min}(Y_i, Y_0, Y_{min})$$

Conversely, when the judgement at step 125e is NO, that is, when no edge $E_i$ is in the cruising lane of the mounted vehicle, the routine proceeds to step 125h, where it is judged if the edge $E_j$ is in the cruising lane of the mounted vehicle.

When the judgement at step 125h is YES, that is, when an edge $E_j$ is in the cruising lane of the mounted vehicle, the routine proceeds to step 125i, where the coordinates $(X_0, Y_0)$ of the intersection P between the inspection plane F(i,j)=1 and the boundary line of the cruising lane of the mounted vehicle are calculated, while at step 125j, the minimum value of the Y-coordinate $Y_j$ of the edge $E_j$, the Y-coordinate $Y_0$ of the intersection $P_0$, and the minimum Y-coordinate $Y_{min}$ is set to $Y_{min}$ by the following formula, then the routine proceeds to step 125k.

$$Y_{min} \leftarrow \text{Min}(Y_j, Y_0, Y_{min})$$

Conversely, when the judgement at step 125h is NO, that is, when no edge $E_j$ is in the cruising lane of the mounted vehicle, the routine proceeds directly to step 125k.

At step 125k, it is judged if the processing has been completed for all of the inspection planes F(i,j). When the judgement is NO, the routine returns to step 125c. Conversely, when the judgement at step 125g is YES, the region enclosed by the vertical line with respect to the boundary line of the cruising lane of the mounted vehicle and the boundary line of the cruising lane of the mounted vehicle is output as the advance range of the mounted vehicle and the relative speed of the vertical line and mounted vehicle is output and the processing ended.

FIG. 18 is a view explaining the output processing. The hatched region enclosed by the edges $E_5$ and $E_6$ and the point having the smallest Y-coordinate among the intersections $P_1$ and $P_2$, that is, the intersection $P_1$, and the boundary line of the cruising lane of the mounted vehicle is output as the advance range.

The method of use of the advance range and the relative speed of the vertical line is not particularly limited, but it is possible for example to display the advance range on a liquid crystal display and control the speed of the mounted vehicle in accordance with the relative speed of the vertical line.

While the invention has been described with reference to specific embodiments chosen for purpose of illustration, it should be apparent that numerous modifications could be made thereto by those skilled in the art without departing from the basic concept and scope of the invention.

The present disclosure relates to subject matter contained in Japanese Patent Applications No. 2000-266393, filed on Sep. 4, 2000, No. 2000-348032, filed on Nov. 15, 2000 and No. 2000-363130, filed on Nov. 29, 2000 the disclosure of which are expressly incorporated herein by reference in its entirety.

What is claimed is:

1. A periphery monitoring system for use in a mounted vehicle having cruise control means, provided with:
   target detecting means for detecting a target,
   judging means for judging in which of a first region along a path of advance of said mounted vehicle, a second region comprised of a region near the outside of said first region, and a third region adjacent to the second region and outside of said first and second regions the target detected by said target detecting means is present, and
   output means for outputting said target detection information output from said target detecting means to such cruise control means for controlling cruising of said mounted vehicle based on a result of judgement of said judging means.

2. A periphery monitoring system as set forth in claim 1, wherein said output means outputs a relative speed and a relative distance of said target with respect to said mounted vehicle and does not output a lateral direction position of said target with respect to said mounted vehicle when it is judged that the target is in said first region by said judging means.

3. A periphery monitoring system as set forth in claim 1, wherein said output means outputs a relative speed, a relative distance, and a lateral direction position of said target with respect to said mounted vehicle when it is judged that the target is in said second region by said judging means.

4. A periphery monitoring system as set forth in claim 1, further provided with reliability calculating means for calculating a reliability of the target detection information output from said output means based on the result of judgement of said judging means, wherein
   said output means outputs a relative speed, a relative distance, and a lateral direction position of said target with respect to said mounted vehicle and the reliability calculated by said reliability calculating means when it is judged that the target is in said third region by said judging means.

5. A periphery monitoring system as set forth in claim 1, further provided with hazard calculating means for calculating a degree of hazard of said target based on at least a relative speed, a relative distance, and a lateral direction position output from said output means.

6. A periphery monitoring system as set forth in claim 5, wherein said output means outputs information on a highly hazardous target calculated by said hazard calculating means when a plurality of targets are detected by said target detecting means.

7. A periphery monitoring system as set forth in claim 1, further provided with width setting means for setting a width of said first region to be set in said judging means based on a predetermined parameter.

8. A periphery monitoring system as set forth in claim 7, wherein said width setting means sets the width based on detection characteristics of said target detecting means.

9. A periphery monitoring system as set forth in claim 1, wherein said target detecting means detects a presence of the target existing in front, a distance to the target, and a relative speed of movement of the target, and
   said system being further provided with cut-in predicting means for predicting a cut-in of the target into a cruising lane of the mounted vehicle based on an output of said target detecting means.

10. A periphery monitoring system as set forth in claim 9, wherein said target detecting means is provided with:
    a milliwave radar for detecting a distance to the target existing in front and a relative speed of movement of said target; and
    an image sensor for detecting the target existing in front.

11. A periphery monitoring system as set forth in claim 10, wherein said cut-in predicting means is provided with:
    edge extracting means for processing an output of said image sensor for extracting an edge of said target and
    predicting means for predicting cut-in for an inspection plane generated by connecting edges having a mutual relationship among edges detected by said edge extracting means.

12. A periphery monitoring system as set forth in claim 11, wherein said cut-in predicting means is provided with holding means for holding previous results of recognition when a previously recognized inspection plane is not currently recognized.

13. A periphery monitoring system as set forth in claim 11, wherein said cut-in predicting means is further provided with:
    boundary line detecting means for detecting a boundary line of a cruising lane of the mounted vehicle, and
    predicted time calculating means for calculating a predicted time until the inspection plane existing outside the cruising lane of the mounted vehicle cuts into the cruising lane of the mounted vehicle whose boundary line has been detected, wherein
    said output means further outputs cut-in information when said predicted time predicted by said predicted time calculating means is smaller than a predetermined threshold time.

14. A periphery monitoring system as set forth in claim 13, wherein said output means is further provided with first threshold time setting means for setting the threshold time.

15. A periphery monitoring system as set forth in claim 13, wherein said output means is further provided with second threshold time setting means for setting the threshold time as a decreasing function of the vehicle speed.

16. A periphery monitoring system as set forth in claim 13, wherein said output means is further provided with third threshold time setting means for setting the threshold time as an increasing function of an inter-vehicle distance.

17. A periphery monitoring system as set forth in claim 1,
wherein said target detecting means detects an existence of the target existing in front, a distance to the target, and a relative speed of the target, and said system being further provided with advance range determining means for determining a range to which the mounted vehicle may advance based on output of said target detecting means.

18. A periphery monitoring system as set forth in claim 17, wherein said target detecting means is provided with:
a milliwave radar for detecting a distance to the target existing in front and a relative speed of movement of said target and an image sensor for detecting the target existing in front.

19. A periphery monitoring system as set forth in claim 18, wherein said advance range determining means is provided with:
edge extracting means for processing an output of said image sensor to extract an edge of the target; and plane recognizing means for treating a plane as a no-advance plane when the target is detected by said milliwave radar on the plane generated by connecting edges extracted by said edge extracting means and when said target is not detected, but said plane cannot be passed through by the mounted vehicle and treating the plane as an advance plane when said plane can be passed through by said mounted vehicle.

20. A periphery monitoring system as set forth in claim 19, wherein:
said edge extracting means is provided with reliability evaluating means for evaluating a reliability of an edge, and outputs only the edge with the reliability evaluated by said reliability evaluating means higher than a predetermined threshold as an extracted edge.

21. A periphery monitoring system as set forth in claim 19, wherein said advance range determining means is further provided with:
boundary line detecting means for detecting a boundary line of a cruising lane of the mounted vehicle, wherein said output means further outputs a region surrounded by a line passing through an edge closest to the mounted vehicle and vertical to said boundary line detected by said boundary line detecting means and said boundary line as an advance range when said no-advance plane is in the cruising lane of the mounted vehicle, and further outputs another region surrounded by said edge or said no-advance plane and an intersection with the boundary line of the cruising lane of the mounted vehicle as the advance range when one edge of said no-advance plane is in the cruising lane of the mounted vehicle.

22. A periphery monitoring system as set forth in claim 1, further provided with width setting means for setting a width of said first region to be set in said judging means based on a predetermined parameter.

23. A periphery monitoring system as set forth in claim 22, wherein said width setting means sets the width based on detection characteristics of said target detecting means.

* * * * *